United States Patent [19]

Warner

[11] Patent Number: 4,997,191
[45] Date of Patent: Mar. 5, 1991

[54] ADJUSTABLE SHAFT SEAL AND METHOD OF ADJUSTMENT

[75] Inventor: Dale J. Warner, Palm Harbor, Fla.

[73] Assignee: Gits Bros. Mfg. Co., Tampa, Fla.

[21] Appl. No.: 422,733

[22] Filed: Oct. 17, 1989

[51] Int. Cl.[5] ............................................. F16J 15/34
[52] U.S. Cl. ........................................ 277/11; 277/85
[58] Field of Search ........................ 277/9, 9.5, 11, 36, 277/64, 66, 81 R, 85, 93 R, 93 SD, 96.1, 108, 112, 113, 128

[56] References Cited

U.S. PATENT DOCUMENTS

| | | | |
|---|---|---|---|
| 2,358,830 | 9/1944 | Schick | 277/36 |
| 2,374,353 | 4/1945 | Jacobsen | 277/81 R X |
| 2,475,550 | 7/1949 | Larsen | 277/81 R X |
| 3,042,414 | 7/1962 | Tracy | 277/11 |
| 3,197,215 | 7/1965 | Hodge | 277/64 |
| 3,363,910 | 1/1968 | Toronchuk | 277/93 X |
| 3,393,916 | 7/1968 | Askew | 277/112 X |
| 3,643,964 | 2/1972 | Snelling et al. | 277/64 X |
| 3,749,412 | 7/1973 | Lingley | 277/81 R |
| 4,039,196 | 8/1977 | Inouye | 277/11 |
| 4,212,475 | 7/1980 | Sedy | 277/96.1 |
| 4,256,313 | 3/1981 | Arnold | 277/11 |
| 4,363,491 | 12/1982 | Secor | 277/81 R |
| 4,434,986 | 3/1984 | Warner . | |
| 4,434,988 | 3/1984 | Warner . | |
| 4,509,773 | 4/1985 | Wentworth | 277/851 X |
| 4,639,000 | 1/1987 | Warner | 277/83 X |
| 4,659,092 | 4/1987 | Wallace et al. | 277/81 R X |
| 4,669,737 | 6/1987 | Diffenderfer | 277/9 |
| 4,688,807 | 8/1987 | Warner . | |
| 4,787,831 | 11/1988 | Thomas et al. | 277/935 D X |

FOREIGN PATENT DOCUMENTS 103495 12/1921 Switzerland ................ 277/96.1

Primary Examiner—Allan N. Shoap
Assistant Examiner—Scott Cummings
Attorney, Agent, or Firm—Hill, Van Santen, Steadman & Simpson

[57] ABSTRACT

A device having a rotary shaft extending through a housing, with the device including a shaft seal for affecting a substantially fluid tight seal between the shaft and the housing, wherein the shaft seal includes: a rotating seal member secured to and rotatable with the shaft, a stationary seal member for affecting sealing contact with the rotating seal member, and wherein the rotating seal member is adjustably mounted on the shaft. The invention provides a single mechanism for both transversely positioning the rotating seal member with respect to the shaft, and moving the rotating seal member to a predetermined axial position along the shaft.

12 Claims, 2 Drawing Sheets

ADJUSTABLE SHAFT SEAL AND METHOD OF ADJUSTMENT

TECHNICAL FIELD

The present invention relates to devices having rotary shafts upon which shaft seals are mounted.

BACKGROUND OF THE INVENTION

In devices having rotary shafts, particularly in adjustable position impeller pumps, it is sometimes desirable to adjust the position of the impeller in the pump by adjusting the position of the shaft upon which the impeller is mounted. Typically, the shaft seals of such pumps include a drive ring attached to the shaft by means of a set screw or other similar fastener. The drive ring provides a base for a mating ring, which forms the rotating portion of the shaft seal. The stationary portion of the shaft seal is secured to the bearing housing. In such an arrangement, positional adjustment of the shaft requires several steps, including partial disassembly of the housing to gain access to the set screw on the drive ring, repositioning and resquaring of the drive ring, resetting the sealing force of the stationary seal member, and reassembly of the housing. Great care must be taken to ensure precise adjustment of the shaft seal, since improper seating of the seal members could result in undue wear and premature failure of the seal. As is apparent from the foregoing description, adjustment of previously known shaft seals is cumbersome, time-consuming and expensive.

SUMMARY OF THE INVENTION

It is therefore an object of the present invention to provide a shaft seal that is simply and reliably adjustable.

This and other objects are achieved by providing a shaft seal having a rotating seal member secured to and rotatable with the shaft, and a stationary seal member affecting sealing contact with the rotating seal member. The rotating seal member is adjustably mounted to the shaft, and is both transversely and axially positioned on the shaft by a cylindrical adjustment abutment. The adjustment abutment has an annular end face that is engageable with the rotating seal member.

In a preferred embodiment, the adjusting abutment is actuated by an adjustment collar that is threaded onto an adaptor, which is in turn sealingly secured to the housing. The rotating seal member includes a mating ring that affects a fluidtight seal with the stationary seal member. The mating ring is secured to, and rotates with, a drive ring that is mounted directly on the shaft. A radial split in the drive ring allows it to be press-fit onto the shaft, thus permitting axial adjustment. The internal diameter of the drive ring is selected such that it maintains full circumferential contact with the shaft, and provides frictional resistance between the shaft and the drive ring that is about two times the maximum forces acting on the drive ring during operation. A wave spring biases the stationary sealing member towards sealing engagement with the rotating seal member, and O-rings are provided to further ensure the integrity of the seal.

These and other objects and advantages of the present invention will become apparent upon reference to the accompanying description, when taken in conjunction with the following drawings.

DESCRIPTION OF THE PREFERRED EMBODIMENT

Figure 1:
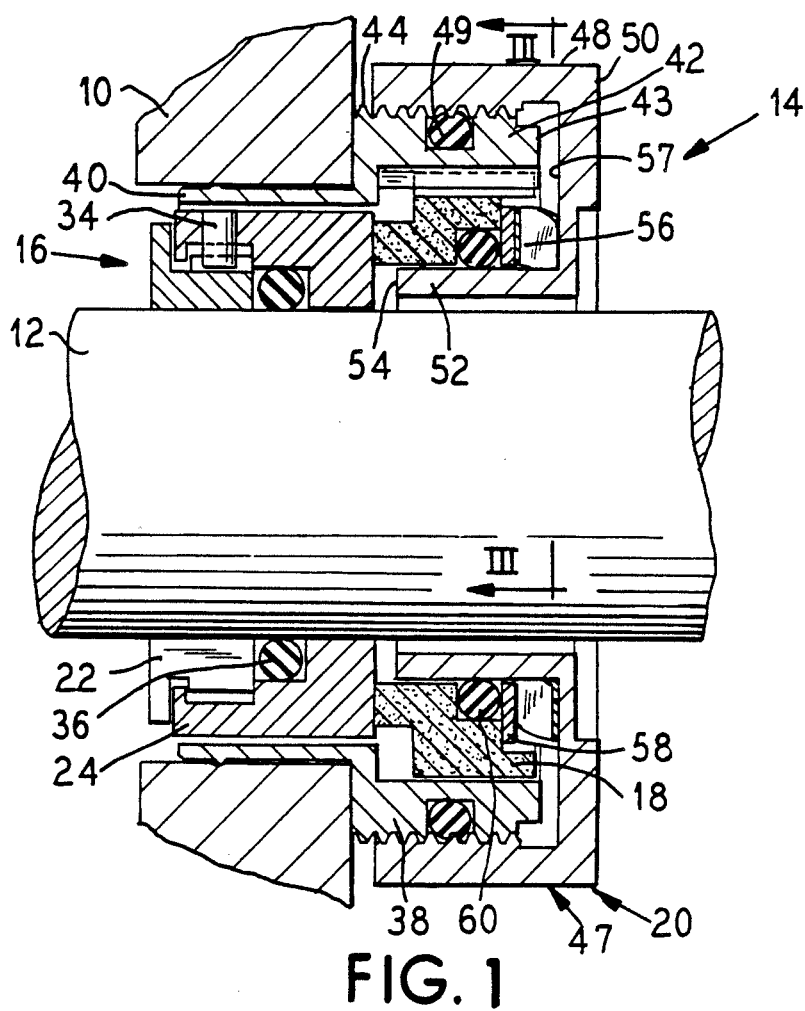
FIG. 1, is a sectional view, partially broken away, of a shaft seal embodying the present invention.

FIG. 1 shows a device having a housing 10 through which extends a rotary shaft 12, with shaft seal 14 providing a substantially fluid-tight seal therebetween. The shaft seal 14 generally includes a rotating seal member 16, a stationary seal member 18, and an adjustment mechanism 20.

Figure 2:
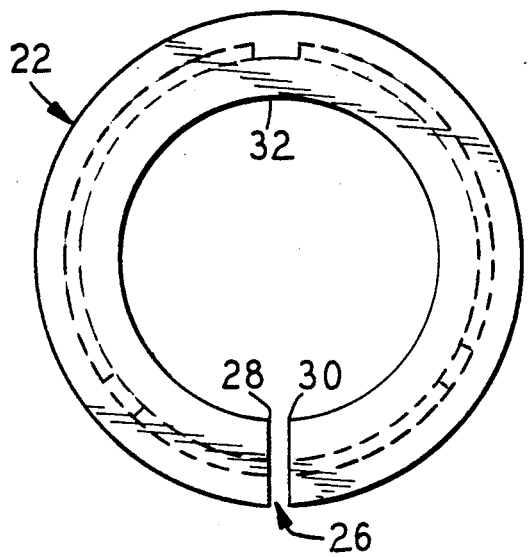
FIG. 2 is a sectional view of a drive ring.

The rotating seal member 16 is composed of a drive ring 22 and a mating ring 24. The drive ring 22 (FIG. 2) is provided with a radial split 26 that allows it to be press-fit onto the shaft 12. It has been found that such structure may tend to provide a three-point contact, with the points of contact occurring at the two ends (28, 30) adjacent the split 26 and at a point 32 radially opposite the split 26. In order to maintain full circumferential contact, the drive ring 22 is undersized with respect to the outside diameter of the shaft 12. In one exemplary embodiment, the drive ring was provided with an inside diameter on the order of 0.020 mm smaller than the 1⅞′ outside diameter of the shaft to which it was attached. Such undersizing further provides a clamping force due to the resiliency of the material (e.g. stainless steel), which creates a frictional resistance between the shaft and the drive ring that is on the order of two times the maximum forces acting on the drive ring during operation of the device.

The mating ring 24 is secured to the drive ring 22 with drive pins 34 or their equivalent. The mating ring 24 rotates with the drive ring 22, and effects a fluid-tight seal by its contact with the stationary seal member 18. A low-compression O-ring 36 provides an axial seal between the rotating seal member 16 and the shaft 12. The diameter of the O-ring is chosen so that it does not provide excessive axial resistance to movement, and further minimizes distortion of the main rotating seal member, i.e. the drive ring 24.

Figure 3:
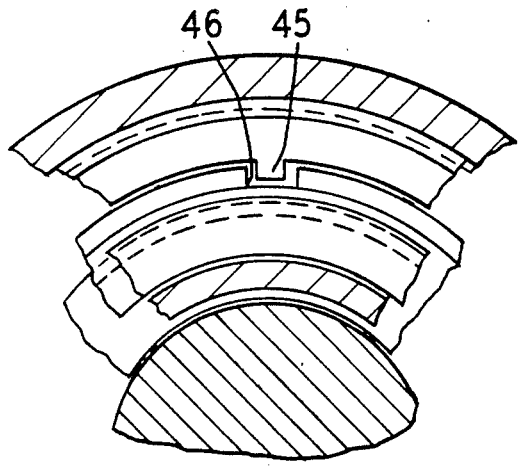
FIG. 3 is a sectional view, partially broken away, taken along lines III—III of FIG. 1.

A stationary part of the shaft seal 14 is secured to the housing 10 by an adaptor 38, which includes a seal portion 40 extending into the housing, and a holder portion 42 on the exterior of the housing. The holder portion 42 is provided with an outer end 43, external threads 44, and a retaining ridge 45. As shown in FIG. 3, the retaining ridge 45 extends into a retaining slot 46 of the stationary seal member 18. The engagement of the retaining ridge 45 with the retaining slot 46 secures the stationary seal member against rotation with respect to the housing 10.

An adjustment collar 47 includes a threaded sleeve 48 for engagement with the threads 44 of the adaptor 38. A sealing member such as O-ring 49 is provided between the threads 44 and the threaded sleeve 48. The adjustment collar 47 also includes a face flange 50 which extends radially inward from the threaded sleeve 48 to secure a cylindrical adjustment abutment 52. The adjustment abutment 52 has an end face 54, which is engageable with the rotating seal member 16.

A seal spring 56, here shown as a wave spring, is interposed between the interior surface 57 of the face flange 50 and a spring abutment 58. The seal spring 56 biases the stationary seal member 18 towards engagement with the mating ring 24, and thus determines the sealing force of the shaft seal 14. An O-ring 60 abuts the stationary seal member 18, the adjustment abutment 52, and the spring abutment 58 to further ensure the fluid-tightness of the shaft seal 14.

Figure 4:
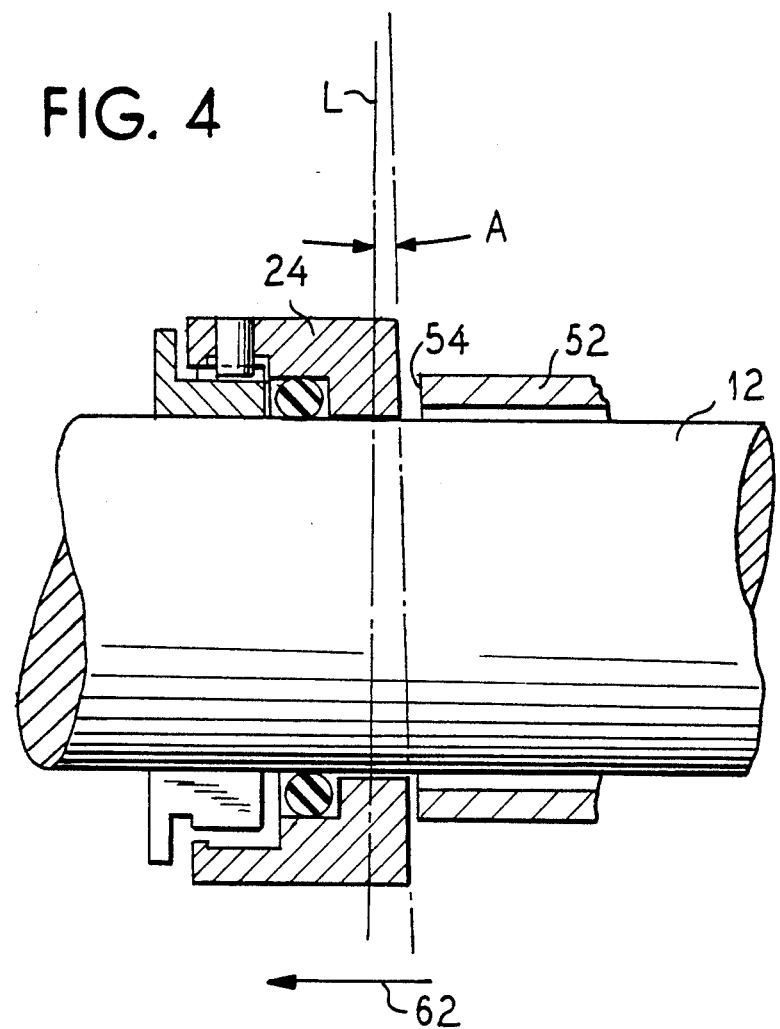
FIG. 4 is a sectional view of the seal prior to final adjustment
Figure 5:
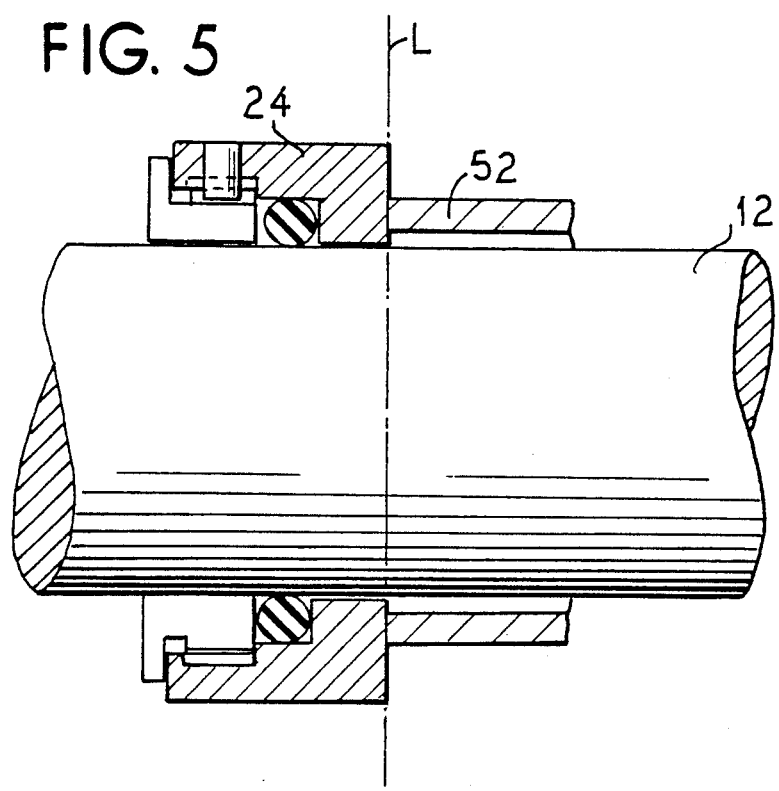
FIG. 5 is a sectional view of the seal being brought into proper alignment by the disclosed adjustment abutment.

Installation and operation of the shaft seal are described with reference to FIGS. 1, 4, and 5. As illustrated in FIG. 4., the drive ring 22 has been press-fit onto the shaft 12 so that the mating ring 24 is an approximately correct position. The precise proper axial position of the mating ring is indicated by the line L. Additionally, due to the resiliency of the drive ring 22, the mating ring 24 is slightly out of squareness with the shaft 12, as indicated by the angle A. Next, the adjustment collar 47 is threaded onto the adapter 38 and tightened until the interior surface 57 of the face flange 50 abuts the outer end 43 of the adaptor 38. This causes the adjustment abutment to simultaneously move in the direction of arrow 62, until the end face 54 of the adjustment abutment engages the surface of the mating ring 24, and axially moves the rotating seal member precisely to its proper position, as seen in FIG. 5 With the face 54 and the mating ring 24 engaged as shown, slight rotation of the shaft 12 overcomes the resiliency of the drive ring 22, and brings the stationary seal member into squareness with the shaft. Thereafter, the adjustment collar is backed off in order to set the operating length for which the seal was originally designed, i.e. to optimally set the bias of the seal spring 56.

In a preferred embodiment, the threads 44 and the threaded sleeve 43 are provided with 1/32' threads having a pitch of 32 to the inch. If the seal is designed such that a 1/32' gap is desired, the adjustment collar 47 is backed off one turn. Thereafter, in all respects the seal functions as a standard balance seal typical of standard prior seal designs. However, if it is desired to adjust the shaft 12 by moving it outwardly of the housing 10, this can be accommodated by merely backing off the adjustment collar 47. If the shaft is, for example, backed off out of the housing 1/16 of an inch, the collar 47 is merely rotated two full turns outwardly. By doing so, once again the proper operating length is maintained. If, on the other hand, the shaft 12 is moved outwardly too greatly so that there could be a possible leakage created at the interface between the O-ring 49 and the threads, then the adjustment collar 47 is simply backed off, the shaft 12 is moved out, and then the adjustment collar 47 is retightened down, whereby the adjustment abutment will be pressed against the rotating seal member, forcing the entire drive ring 22 and mating ring 24 back. Retightening is continued until the interior surface 57 of the face flange 50 abuts the outer end of the adaptor 33, at which point the adjustment collar 47 is again backed off one full turn or 1/32'.

On the other hand, if the adjustment is such that the shaft 12 is to be moved inwardly into the housing 10, so long as the movement is less than a 1/32', adjustment can be accommodated by rotating the adjustment collar 47 inwardly. Of course, where it is anticipated that, in a particular environment, the shaft is going to require significant inward movement, the original sleeve/adaptor interface length could be greater and the original dimensions could be set differently. For example, the length of the adjustment abutment is chosen to be proportionally different with respect to the adaptor, or a different thread pitch could be utilized. In the event, however, that the shaft is to be moved inwardly a greater than normal distance, i.e. one beyond the travel permitted of the adjustment collar, then the entire drive ring assembly can be pulled outwardly along the shaft and reset in the same manner as described hereinabove, i.e. by threading the collar against it until the adjustment abutment forces the rotating seal member back to its reset position.

Although the invention has been described with reference to a specific embodiment, one of ordinary skill will recognize that various changes may be made thereto without departing from the scope and spirit of the invention as defined by the appended claims.

I claim:

1. A device having a rotary shaft extending through a housing, said device including a shaft seal for affecting a substantially fluid-tight seal between said shaft and said housing, wherein said shaft seal comprises the following:

annular rotating seal means secured to and rotable with said shaft;

annular stationary means for affecting sealing contact with said rotating seal means:

mounting means for adjustably mounting said rotating seal means on said shaft; and a single adjustment means for both moving said rotating seal means into squareness with said shaft, and moving said rotating seal means to a predetermined axial position along said shaft, said adjustment means including a cylindrical adjustment abutment portion concentric with and disposed radially inward of said stationary seal means, said cylindrical adjustment abutment portion having an annular end face and said adjustment abutment portion being selectively movable coaxially with said shaft.

2. A device according to claim 1, further wherein said adjustment means of said shaft seal further comprises:

actuating means for moving said adjustment abutment portion, bringing said end face into contact with said rotating seal means, and causing said adjustment abutment portion to transversely and axially position said rotating seal means on said shaft.

3. A device according to claim 2, further wherein said actuating means comprises the following:

an adapter having a seal portion secured to said housing and an externally threaded holder portion exterior of said housing; and an adjustment collar having an internally threaded sleeve portion adapted for threaded engagement with said holder portion, said sleeve portion coaxially surrounding said adjustment, and an annular face flange portion extending between, said sleeve portion and said adjustment abutment portion.

4. A device according to claim 3, further wherein said rotating seal means of said shaft seal comprises a drive ring mounted directly on and rotating with said shaft, and a mating ring affixed to and rotating with said drive ring, said mating ring contacting said stationary seal means to affect a fluid tight seal.

5. A device according to claim 4, further wherein said mounting means of said shaft seal comprises a radial split in said drive ring, whereby said drive ring is press fit onto said shaft.

6. A device according to claim 5, further wherein said drive ring of said shaft seal further comprises means for maintaining inner circumferential contact of said drive ring with said shaft, and providing frictional resistance between said shaft and said drive ring that is on the order of two times the maximum forces acting on said drive ring during operation of said device.

7. A device according to claim 6, wherein said shaft seal further comprises the following:
   spring means, between said face flange and said stationary seal means, for biasing said stationary seal means towards engagement with said mating ring; and
   wherein said adjustment means further comprises means for adjusting the biasing force of said spring means.

8. A device according to claim 7, further wherein an annular spring abutment is interposed between said spring means and said stationary seal means.

9. A device according to claim 3, further wherein a first O-ring is located between said rotating seal means and said shaft; a second O-ring is located between said stationary seal means and said adjustment abutment; and a third O-ring is located between said holder portion and said threaded sleeve.

10. A device according to claim 9, further wherein said spring means comprises a wave spring.

11. A device according to claim 10, wherein said shaft seal comprises retaining means for securing said stationary seal member against rotation with respect to said housing.

12. A device according to claim 11, wherein said retaining means comprises the following:
   a retaining ridge extending axially on an inner surface of said adapter; and
   a retaining slot extending axially on an outer surface of said stationary seal member and receiving said retaining ridge.

* * * * *